US012583216B2

(12) United States Patent
Lindner et al.

(10) Patent No.: US 12,583,216 B2
(45) Date of Patent: Mar. 24, 2026

(54) METHOD FOR PRODUCING SEPARATED STRIP-LIKE LAMINATE COMPONENTS COMPRISING AN ELECTRONIC COMPONENT EMBEDDED BETWEEN TWO LAMINATE LAYERS OF A TAPE LIKE ADHESIVE MATERIAL, AND DEVICE FOR PRODUCING SUCH LAMINATE COMPONENTS

(71) Applicant: FISCHER TIRETECH GERMANY GMBH, Burgkunstadt (DE)

(72) Inventors: Stefan Lindner, Kulmbach (DE);
Frank Schmidt, Thurnau (DE);
Matthias Schneider, Lichtenfels (DE)

(73) Assignee: FISCHER TIRETECH GERMANY GMBH, Burgkunstadt (DE)

( * ) Notice: Subject to any disclaimer, the term of this patent is extended or adjusted under 35 U.S.C. 154(b) by 302 days.

(21) Appl. No.: 18/367,084

(22) Filed: Sep. 12, 2023

(65) Prior Publication Data

US 2024/0100818 A1      Mar. 28, 2024

(30) Foreign Application Priority Data

Sep. 22, 2022    (DE) ......................... 102022124337.0

(51) Int. Cl.
*B32B 41/00*      (2006.01)
*B32B 37/22*      (2006.01)
*B32B 38/00*      (2006.01)

(52) U.S. Cl.
CPC ............ *B32B 41/00* (2013.01); *B32B 37/226* (2013.01); *B32B 38/0004* (2013.01); *B32B 2457/00* (2013.01); *B32B 2519/02* (2013.01)

(58) Field of Classification Search
CPC ... B32B 41/00; B32B 37/226; B32B 38/0004; B32B 2457/00; B32B 2519/02;
(Continued)

(56) References Cited

U.S. PATENT DOCUMENTS

| 5,938,890 | A | 8/1999 | Schlinkmann et al. |
| 2003/0136503 | A1* | 7/2003 | Green .............. G06K 19/07758 |
| | | | 156/264 |
| 2022/0203638 | A1 | 6/2022 | Vecchione |

FOREIGN PATENT DOCUMENTS

| DE | 202013105825 U1 | 1/2014 |
| DE | 202021101889 U1 | 4/2021 |

(Continued)

OTHER PUBLICATIONS

Extract of German Office Action dated Apr. 5, 2023, 1 Page.
(Continued)

*Primary Examiner* — Michael N Orlando
*Assistant Examiner* — Joshel Rivera
(74) *Attorney, Agent, or Firm* — LUCAS & MERCANTI, LLP; Klaus P. Stoffel

(57)      ABSTRACT

A method for producing separated strip-like laminate components including an electronic component embedded between two laminate layers of a tape-like material. Individual components are placed at defined intervals by a placement device onto a tape-like, lower first laminate layer moved in a conveying direction by a transport device, after which a tape-like, upper second laminate layer moved in the conveying direction is applied to the first laminate layer with embedding of the components to form a laminate tape. The individual strip-like laminate components are cut from the laminate tape by a cutting device having a movable cutting blade, which laminate components are picked up by a gripper device and transported away. The front end of the laminate tape is gripped by the gripper device in the region of a component and moved synchronously with the clocked movement of the transport device by a predetermined distance through the cutting device and positioned relative to the cutting blade. The actual position of the component in the laminate component in relation to the conveying direc-
(Continued)

tion is detected by a measuring device connected down-stream of the cutting device. When a deviation of the actual position from a defined target position is detected, the synchronous movement of the transport device and the gripper device is controlled in dependence on the detected deviation.

36 Claims, 12 Drawing Sheets

(58) Field of Classification Search
CPC ............ B60C 19/00; B29D 2030/0077; B29D 2030/0083; B29D 30/0061; B26D 1/085; B26D 5/00; B26D 7/01
USPC ................... 156/60, 64, 350, 351, 378, 379
See application file for complete search history.

(56) References Cited

FOREIGN PATENT DOCUMENTS

| | | | |
|----|------------|----|---------|
| EP | 3756870 | A1 | 12/2020 |
| JP | 2021093606 | A | 6/2021 |
| JP | 2022530998 | A | 7/2022 |
| WO | 2020137615 | A1 | 7/2020 |
| WO | 2020225668 | A1 | 11/2020 |

OTHER PUBLICATIONS

Japanese Patent Office issued an Office Action on Nov. 12, 2024 regarding parallel Japanese Patent Application No. 2023-149919, 13 Pages.

European Patent Office issued a Search Report on Jan. 26, 2024 regarding parallel European Patent Application No. 23194613.8, 8 Pages.

* cited by examiner

METHOD FOR PRODUCING SEPARATED STRIP-LIKE LAMINATE COMPONENTS COMPRISING AN ELECTRONIC COMPONENT EMBEDDED BETWEEN TWO LAMINATE LAYERS OF A TAPE LIKE ADHESIVE MATERIAL, AND DEVICE FOR PRODUCING SUCH LAMINATE COMPONENTS

CROSS-REFERENCE TO RELATED APPLICATIONS

The present application claims priority of DE 10 2022 124 337.0, filed Sep. 22, 2022, the priority of this application is hereby claimed, and this application is incorporated herein by reference.

BACKGROUND OF THE INVENTION

The invention relates to a method for producing separated strip-like laminate components comprising an electronic component embedded between two laminate layers of a tape-like, adhesive material, in particular a rubberized material, in which method individual components are placed by means of a placement device onto a tape-like, lower first laminate layer moved in a conveying direction by means of a transport means, after which a tape-like, upper second laminate layer moved in the conveying direction is applied to the first laminate layer with embedding of the components so as to form a laminate tape, the individual strip-like laminate components being cut from the laminate tape, which is conveyed by means of the transport means, by a cutting device comprising at least one movable cutting blade, which laminate components are picked up by means of a gripper device and transported away, the front end of the laminate tape being gripped by means of the gripper device in the region of a component and moved synchronously with the clocked movement of the transport means by a predetermined distance through the cutting device and positioned relative to the cutting blade.

For various applications, it is sometimes necessary to arrange or integrate a narrow strip of a material tape on an object, in which strip at least one electronic component is embedded. The material tape serves here as a carrier for the component. Such a component serves, for example, for marking purposes, so that the object on which it is arranged can be marked or identified by means of the component. The material tape is a flexible tape material made of plastic, preferably of a rubberized material, this being understood to mean industrially manufactured elastomers. Depending on the material, this may also be tacky. The electronic component may be any component that can interact in any way with an external sensing device. In particular, the component can be an RFID chip on which defined information can be stored, which can then be read out at the respective object equipped with the RFID chip for its identification.

One application example where such laminate components can be installed is in the field of tire manufacture. By integrating such a laminate component into the tire, each individual tire is individually provided with such a marking element, for example an RFID chip, so that it can be identified. Corresponding information relating to the date of manufacture, the manufacturing batch, the permissible inflation pressure, etc., can be stored on the RFID chip, for example, and read out as required. However, this application example is not limiting; applications in other areas are also conceivable.

During the production of such laminate component strips, the endless laminate tape with the embedded components is first produced. For this purpose, the separated components or RFID chips are placed on a tape-like, lower first laminate layer made of the described material at defined intervals with a placement device. The first laminate layer is moved in a defined conveying direction by a transport means. A tape-like, upper second laminate layer, which is also moved in the conveying direction, is then placed on this first laminate layer populated with the components, so that the components are embedded and a laminate tape is formed. The result is a sandwich tape, i.e. a corresponding two-layer rubberized laminate tape, the individual layers of which can no longer be separated due to their adhesion or tackiness.

It is then necessary to cut the individual strips from this material tape, each strip comprising at least one component. However, cutting narrow strips is particularly problematic when very narrow strips are to be cut, for example when the strip width is in the range of a few millimeters, for example about 8-12 mm. A cutting device which is particularly suitable for cutting such a laminate tape is known from DE 20 2021 101 889 U1. This cutting device comprises a gripper device which is designed in such a way that it fixes the material tape, during the cutting process, to the table of the cutting device, against which table the cutting blade is moved. When the cutting blade moves down, the laminate strip comprising the at least one component is cut. After the cutting blade has moved up again, the gripper device picks up the cut laminate strip and transports it away. The laminate band is fed to the cutting device or into the cutting area via a clocked placement operation of the transport means, i.e., the laminate band is transported in the conveying direction for each individual cutting operation by a defined distance or path corresponding to the desired cut length. In the case of the cutting device known from DE 20 2021 101 889 U1, the clocked conveying operation is carried out with the participation of the gripper device. In the known cutting device, the gripper device grips the front end of the laminate tape in the area of the component, the gripper device being moved synchronously with the clocked movement of the transport means by precisely the predetermined distance, so that the laminate tape is moved through the cutting device into the actual cutting position and is positioned relative to the cutting blade.

Due to the clocked feed, which in itself can be controlled very precisely, it should be possible to always cut the individual laminate components in such a way that the component is always in the same position within the laminate, i.e., for example, is always positioned centrally when viewed in the conveying direction. Corresponding positioning is regularly defined as a boundary condition, i.e., relatively narrow tolerances are specified in this respect. Nevertheless, it has been found in operation that the position of the component, viewed in the conveying direction, sometimes changes, i.e., laminate components are cut in which the component, viewed in the conveying direction, is not exactly positioned. This is due to the fact that the laminate tape changes shape slightly, particularly in the area between the points where the upper laminate layer is laminated onto the lower laminate layer and at the actual interface where the cutting blade separates the laminate tape. For the most part, it contracts slightly when viewed in the conveying direction. This results from the fact that the two laminate layers are originally wound into large rolls from which they are unwound for the laminating process. Each laminate layer has a certain inherent tension. After the two slightly stretched laminate layers have been laminated together under slight pressure, this inherent tension is relieved, which manifests itself in particular in a slight shrinkage or contraction in the conveying direction. This shrinkage of the laminate material results in a change in the position of the individual component positions or in the distance between the components. This means that it can no longer be guaranteed that the component in question will be in the target position within the laminate component after the actual cutting process. There is a risk that such a component will fail to meet the boundary conditions set for product quality.

SUMMARY OF THE INVENTION

The invention therefore addresses the problem of providing a method that is improved by comparison.

To solve this problem, in a method of the type described above, it is provided in accordance with the invention that the actual position of the component in the laminate component in relation to the conveying direction is detected by means of a measuring device connected downstream of the cutting device, and, when a deviation of the actual position from a defined target position is detected, the synchronous movement of the transport means and the gripper device is controlled in dependence on the detected deviation.

According to the invention, the position of the component within the laminate component is detected for each laminate component by means of a measuring device downstream of the cutting device, and it is checked whether or not this position is correct or lies within a defined tolerance interval. The measuring device can therefore be used to detect any deviation of the actual position of the component in the laminate component from a defined target position. If such a deviation is detected, which impairs the product quality, the synchronous movement of the transport means, which may be a transport band or a transport belt such as a toothed or synchronous belt, and of the gripper device is controlled in dependence on the detected deviation, according to the invention by means of a suitable control device. The control is such that the positional inaccuracy is compensated for by intervening in the movement and thus positioning process with which the leading end of the laminate tape to be cut is positioned with respect to the cutting device or the cutting plane, and is readjusted accordingly so that a slight positioning adjustment is made which ensures that the laminate component cut in the subsequent cut is again such that the embedded component is in the correct position or within the positional interval. There is thus a targeted intervention in the clocked transport operation, but based on the position deviation actually detected, which in turn ultimately results from the shrinkage behavior of the laminate tape. Consequently, the cut-off length is varied once to ensure that the laminate strip to be subsequently cut is again largely or completely deviation-free, i.e., that the component is again positioned in the laminate strip as required.

Since the laminate component measurement or deviation check provided in accordance with the invention is carried out for each laminate component, it is therefore possible to react immediately to any deviation and to control the corresponding clocked transport operation accordingly in order to be able to compensate for a deviation again immediately.

To detect the actual position of the component within the laminate component, according to the invention at least one distance value of a component position assigned to the component relative to at least one edge of the laminate component running transverse to the conveying direction can be determined by means of the measuring device, with any deviation being determined on the basis of the distance value.

Accordingly, the measuring device measures the laminate component to determine a distance value. This distance value describes the distance between a component position assigned to the component, for example an edge or the like that is detected by the measuring device and appears on the laminate component, and an edge of the laminate component that runs transverse to the conveying direction, i.e. the actual cut edge. This distance value is a measure of the position of the component in the laminate component and forms the basis for determining whether or not a possible deviation exists.

In a development of the invention, several such distance values can be detected by means of the measuring device in order to be able to describe the actual position of the component more precisely. It can be provided that a first distance value between a first component position and a first edge lying in the conveying direction as well as a second distance value between a second component position and a second edge lying against the conveying direction are determined, with a possible deviation being determined on the basis of both distance values. This means that both measurement results or distance values are included in the deviation determination, with the one distance value being measured in the conveying direction and the second distance value being measured against the conveying direction. Each distance value is based on a specific component position, wherein this component position can be constituted by corresponding, detected edges of the component. If the component is an RFID chip, for example, it has a regular elongate shape, with the actual chip body as well as the antennas protruding on both sides of it. Thus, it is an elongate component that runs along the longitudinal axis of the laminate strip. Inevitably, corresponding first and second edges are formed, one lying in the conveying direction, the other against the conveying direction, these two edges defining the first and second component positions from which the distance values are detected. In this way, an even more precise actual position detection can be achieved.

To further refine the position detection, it is conceivable that two first distance values to separate first component positions offset transversely to the conveying direction and two second distance values to separate second component positions offset transversely to the conveying direction are determined and any deviation is determined on the basis of all four distance values. Thus, two distance values lying in the conveying direction and two distance values lying against the conveying direction are detected, the respective distance values being offset transversely to the conveying direction. As a result, four specific component positions are detected with regard to their position relative to the respective laminate component edge, so that four distance values are available which allow an exact description of the actual position, combined with an exact determination option for any deviation.

An offset value describing the deviation can be determined on the basis of the distance value or values and describes any offset of a distinguished component position, in particular the center of the component as seen in the conveying direction, from a target position, in particular the center of the laminate component as seen in the conveying direction, the transport means and the gripper device being controlled in dependence on the offset value. As described, it is possible to determine a corresponding, distinguished component position or correspondingly several component positions with the measuring device. These are, for example, corresponding component edges. On the basis of these component positions, a distinguished component position, preferably the component center as seen in the conveying direction, can now be determined and it can be checked whether this distinguished component position corresponds to a target position, i.e., preferably the laminate component center, or whether it is offset in or against the conveying direction. This offset value is then the basis for the corresponding control of the conveying cycle. The offset value can be used here directly as a correction value by which the distance by which the laminate tape is conveyed is increased or decreased, the transport means and the gripper device being controlled to move the laminate tape by the changed distance. The offset value or correction value thus indicates the specific deviation of the distinguished component position in or against the conveying direction. It can therefore be a positive or a negative value. The value of the distance by which the laminate tape is originally transported in a clocked manner is now changed by precisely this offset or correction value, i.e., either increased or decreased, and controlled accordingly via the control device and the gripper device. For example, the offset value and thus the correction value can be determined as follows:

$$K=[(A1+A2)/2-(B1+B2)/2]/2$$

where the following applies:
  K=correction value
  A1=first distance value in conveying direction
  A2=second distance value in conveying direction
  B1=first distance value against the conveying direction
  B2=second distance value against the conveying direction.

The correction value determined in this way indicates the deviation value by which the center of the component is offset with respect to the outer edges. With this value, the changed control can be effected immediately.

It is conceivable here that the synchronous movement of the transport means and the gripper device is controlled in dependence on a detected deviation only if the detected deviation or a determined offset or correction value is greater than a defined threshold value. This means that a control intervention does not take place for every infinitesimally small deviation, but only if a minimum deviation is given. For this purpose, a corresponding threshold value is defined, or a corresponding threshold value interval is specified. The measuring device or the control device continuously checks whether or not the deviation or the offset or correction value is smaller than the defined threshold value or lies within the threshold value interval. In the former case, no correction is made because the actual position of the component is within the defined tolerance. In the second case, an immediate correction is required because the deviation of the actual position from the target position is sufficiently large and requires a correction. In this case, the respective threshold value can be positive or negative depending on the direction of the offset, as can the corresponding offset or correction value. However, it is also conceivable to consider only the respective value amount. If an interval is set, this can be, for example, +/−0.25 mm for exemplary cutting lengths between 8-12 mm. If the deviation or the offset or correction value lies within the interval +/−0.25, no correction is made, otherwise the correction is made by the corresponding correction or offset value determined.

In a development of the invention, it can also be provided that control of the synchronous movement of the transport means and the gripper device is limited to a defined limit value in dependence on a detected deviation if the detected deviation or a determined offset or correction value is greater than a defined limit value. This means that not only a lower limit is defined, as to from when a correction is made, but also an upper limit is set, as to how large the maximum correction can be. For example, a distance change of +/−0.3 mm can be set as the maximum offset or correction value. If, for example, the offset or correction value determined is now 0.5 mm, correction is only carried out with a maximum correction value of 0.3 mm. It is conceivable to define different limit values for different cut lengths. For example, a limit value of +/−0.15 mm can be set for a cut length or target length of the laminate component of 8 mm, a limit value of +/−0.3 mm for a cut width of 10 mm, and a limit value of +/−0.45 mm for a cut width of 12 mm. By setting such a limit value, any correction overshoots are avoided, i.e., excessive correction, which may lead to immediate counter-correction in the next but one cut, is avoided.

According to a particularly expedient development, it is provided that, together with the transport means and the gripper device, the placement device, which can be moved in and against the conveying direction, is also controlled in dependence on the deviation determined. As described, the individual components are gripped from a corresponding component reservoir by means of the placement device, i.e., a pick-and-place device, and are placed on the lower first laminate layer with accurate positioning. In order to ensure that all the placed and subsequently embedded components are at the same distance from one another in the laminate tape even in the event of any intervention in the intermittent transport operation, any tracking or readjustment of the transport means and the gripper device is also tracked with regard to the movement of the placement device in and against the conveying direction. This means, for example, that an increase in the distance from the original 10 mm to 10.2 mm, i.e., a correction in the conveying direction of 0.2 mm, leads to a correspondingly synchronous movement of the applicator device, also by 0.2 mm in the conveying direction. Due to the increased distance, i.e. the slight increase in the clocked transport distance by 0.2 mm, the distance between the just placed component and the previously placed component would increase by 0.2 mm, at least for this placement step following the positioning correction, if the position of the placement device remains the same. However, if the placement device is also adjusted accordingly, it is ensured that the distance between the placed components always remains the same despite the changed distance.

The placement device can be moved at least by the determined offset or correction value synchronously with the movement of the transport means and the gripper device with the changed distance. If, as described, the original distance is changed by +/−x, the placement device is also moved by +/−x.

As described above, the laminate tape shows some shrinkage in the conveying direction, that is, it contracts marginally, resulting from the inherent residual stresses of the laminated laminate layers. This leads to the possible position variations of the component. This shrinkage can be predicted to some degree, meaning that a certain, theoretical amount of shrinkage will always occur, regardless of how large the actual shrinkage is then. To counter this inherently, an expedient development of the invention provides that the placement device is moved during each placement operation in such a way that the actual distance between two components placed on the first laminate layer is greater than a target length of the cut laminate component by a defined value compensating for a shrinkage of the laminate tape in the conveying direction. This means that the components are inherently placed at a slightly greater distance than the actual cut length at which the components are cut. This fixed value, by which the placed component spacing is increased, is therefore used to roughly compensate to a certain extent for any shrinkage that regularly occurs. If, for example, the components are cut with a target length of 10 mm, this shrinkage compensation value can be 0.15 mm, so that a shrinkage of 0.15 mm is always compensated or compensated in advance. The components are then placed with a spacing of 10.15 mm. If the shrinkage is just this 0.15 mm, they ideally have a target distance of 10 mm at the time of cutting. However, this shrinkage compensation value can only be used for rough shrinkage correction, since the actual shrinkage is of course always material-dependent. The shrinkage correction value is only defined against the conveying direction, since the laminate tape contracts in the longitudinal direction.

In the event that the conveying device has not detected any significant deviation, i.e., no follow-up control of the clocked transport takes place, only the pre-set shrinkage compensation provided for in the invention can take place as described above. This means that the placement device is always moved marginally for each placement operation by precisely the shrinkage correction value in the opposite direction to the conveying direction. However, if a corresponding deviation has been detected, both the shrinkage correction value and the actual correction value are included in the movement of the placement device. In this case, the movement of the placement device results from the defined length dimension, i.e., the shrinkage correction value, and the correction value, which can, however, be positive or negative. Thus, if a shrinkage correction value of –0.15 mm is set (a negative value, since it is opposite to the conveying direction), and a correction value of +0.3 mm results, the placement device actually moves +0.15 mm in the conveying direction. This means that, despite correction intervention in the timed transport of the laminate tape, exact component positioning is ensured, taking both the correction value and the shrinkage compensation value into account.

As described, the measuring device is used to detect any deviation or to evaluate it by means of a suitable control device and, if necessary, to determine the offset or correction value. The measuring device can be a camera or a fluoroscopy device, i.e., an X-ray or ultrasonic device, or a sensor such as a profile sensor. These types of measuring equipment record corresponding camera or fluoroscopic images of the laminate component or sensor signals. The corresponding deviation or offset or correction value can now be determined by evaluating these images or sensor signals using suitable evaluation software or suitable evaluation algorithms. The corresponding evaluation software or the evaluation algorithm is designed in such a way that it can also be used to determine corresponding component positions, from which the corresponding distance values are recorded, and the like. In the case of a conventional camera device, for example, a corresponding illumination device is assigned to it, for example a very rapidly circulating ring light, during which circulation the camera records the camera image. The camera image then shows, due to the running light, corresponding contour edges resulting from the component edges, which can be used as a basis for the corresponding deviation determination. In transmitted light images, the component is exactly visible anyway, so that the corresponding evaluation algorithm can define the component positions directly from this.

An expedient development of the invention provides for the arrangement of a testing device by means of which the functionality of the component of the laminate component is tested. That is to say, in addition to detecting any deviation, a functional test is also carried out. If the component is, for example, an RFID chip, the testing device can be used to check the communication capability of the RFID chip, just as, for example, an identification number of the chip can be checked and recorded, which can then be stored in a control device, for example together with the measured value of the functional test. Preferably, this functional test is performed simultaneously with the measurement by means of the measuring device, for example the recording of the images to be evaluated.

For this purpose, the gripper device can transport the component to a transfer device to which the measuring device and, if provided, the testing device are assigned. As described, the gripper device picks up the cut laminate component and transports it away. This removal ends with the transfer of the laminate component to the transfer device, where deviation determination and, if necessary, functional testing then take place immediately. A gripper device that can be used for this purpose is described in DE 20 2021 101 889 U1. The gripper device there comprises two separate grippers which are directed in opposite directions and are arranged parallel to one another. They are arranged on a common carrier which is rotatable about a vertical axis so that the gripper device can be rotated about the vertical axis. Each gripper can be moved separately linearly along a horizontal axis relative to the carrier, and can also be raised and lowered vertically, i.e. parallel to the axis of rotation of the entire gripper device. This means that corresponding degrees of freedom are given to each gripper, and the entire gripper device can also be rotated. This allows one gripper device to be positioned to receive the leading end of the laminate tape, while the other gripper device with a received laminate component is positioned in a transfer position for transferring the laminate component to the transfer device. Once the respective operations are completed and the first gripper has picked up the newly cut laminate component and the second gripper has transferred the laminate component, the entire gripper device is rotated 180° so that the newly cut laminate component can be delivered to the transfer device while at the same time the unoccupied gripper can re-engage the leading laminate tape edge. With regard to the specific function, explicit reference is made to DE 20 2021 101 889 U1, the disclosure content of which is fully incorporated in the present disclosure of the invention.

The measuring device and thus the deviation detection, as well as the testing device if necessary, perform a finished part test, in the course of which it can ultimately also be determined whether the tested laminate component is a good part that meets all requirements or a bad part that must not be processed further. In this case, it can be provided that a laminate component which has a deviation not exceeding a reject limit value and which, if detected, fulfills the requirement set for its functionality is deposited on a winding tape. In this case, therefore, it is a good part that is placed on a corresponding winding tape, wherein the laminate component can also be pressed slightly onto the winding tape by means of a pressing ram or the like, so that it sticks there slightly. However, in the event that a laminate component exhibits a deviation exceeding a reject limit or does not meet a requirement set for its functionality, this laminate component is discarded as a bad part, i.e., it is not placed on the winding tape.

Since the corresponding deviation measurement or function test as described above is preferably carried out on the transfer device, an expedient development of the invention provides that the laminate component to be deposited on the winding tape is deposited on the winding tape by means of the transfer device. The transfer device thus transfers the good part onto the winding tape. However, if it is a bad part that is to be discarded, the laminate component to be discarded can also be discarded directly by the transfer device. For this purpose, the transfer device itself can advantageously be designed as a pivoting device that is positioned horizontally in a transfer position in which the laminate component is transferred to it by the gripper device. It is located, for example, vertically below the measuring device or camera device, and the laminate component is located in the measuring area. The testing device is also located adjacent to this position, so that measurement and testing can take place synchronously. Immediately after the corresponding values or information have been recorded, it is clear whether the part is a good part or a bad part. The transfer device pivots through 180° in the conveying direction and takes the laminate component, which adheres easily to it due to its tackiness, or which is fixed by a magnet or similar provided on the transfer device, and pivots it directly onto the winding tape, where the laminate component then adheres. The transfer device then pivots back to the horizontal transfer position. However, if it is a bad part, the transfer device simply swings down so that the bad laminate component falls off the transfer device or is ejected and lands in a bad part container located below it.

In addition to the method itself, the invention also relates to a device for producing separated strip-like laminate components comprising an electronic component embedded between two laminate layers of a tape-like, adhesive material, in particular a rubberized material, comprising a first feed device for feeding a lower, tape-like first laminate layer and a transport means receiving the first laminate layer, a placement device for placing individual components at defined intervals on the first laminate layer, which is moved in a conveying direction by the transport means, a second feed device for feeding an upper, tape-like second laminate layer and placing the second laminate layer on the first laminate layer while embedding the components so as to form a laminate tape, a cutting device comprising at least one movable cutting blade for cutting off individual strip-like laminate components from the laminate tape conveyed by the transport means, a gripper device for picking up and transporting away the individual laminate components, the gripper device being designed for gripping the front end of the laminate tape in the region of a component and being movable synchronously with the transport means movable in clocked fashion by a predetermined distance for moving the laminate tape through the cutting device and positioning the laminate tape relative to the cutting blade.

According to the invention, this device is characterized in that a measuring device is provided downstream of the cutting device and is designed to detect the actual position of the component in the laminate component in relation to the conveying direction, it being possible, when a deviation of the actual position from a defined target position is detected, to control the synchronous movement of the transport means and of the gripper device via a control device in dependence on the detected deviation.

All of the features, properties and advantages described above with respect to the method according to the invention also apply in the same way to the device according to the invention.

The device according to the invention is characterized by the measuring device downstream of the cutting device as well as a corresponding control device, which is able to control the synchronous movement of the transport means and the gripper device depending on a deviation detected by means of the measuring device, in order to be able to compensate for any deviation.

In this context, the measuring device can be set up to determine one or more distance values of one or more component positions assigned to the component from at least one edge of the laminate component running transversely with respect to the conveying direction, and to determine an offset value describing the deviation on the basis of the distance value, the offset value describing any offset of a distinguished component position, in particular of the center of the component as seen in the conveying direction, from a target position, in particular of the center of the laminate component as seen in the conveying direction, the transport means and the gripper device being controllable via the control device in dependence on the offset value. The determination of the corresponding offset value can be carried out in the various ways described above for the method according to the invention. The measuring device has a corresponding control device which has suitable evaluation software or software algorithm in order to carry out the corresponding value determination. The control device can be a control device associated with the measuring device, but also a central control device which controls the system operation, but at least the operation of the transport means and the gripper device, and which is therefore inevitably also associated with the measuring device.

The offset value can be used directly as a correction value by which the specified distance is increased or decreased, the transport means and the gripper device being controllable via the control device in such a way that the laminate tape can be moved by the changed distance. The correction value is therefore used directly by the control device as the basis for the control.

Furthermore, the control device can be set up in such a way that the synchronous movement of the transport means and the gripper device is controlled in dependence on a detected deviation only if the detected deviation or a determined offset or correction value is greater than a defined threshold value or lies outside a defined threshold value interval. This ensures that the control device only triggers a correction if the position deviation is no longer within a corresponding tolerance range.

Furthermore, the control device can be set up in such a way that control of the synchronous movement of the transport means and the gripper device is limited to a defined limit value in dependence on a detected deviation if the detected deviation or a determined offset or correction value is greater than the defined limit value. This means that a maximum correction in and against the conveying direction is ultimately capped via the limit value, even if a larger correction value has been determined.

Furthermore, together with the transport means and the gripper device, the placement device, which can be moved in and against the conveying direction, can also be controlled via the control device in dependence on the deviation determined. The synchronous movement of the placement device by the corresponding correction value ensures that the components are always placed at the same distance, as already described above for the method.

Furthermore, the control device for controlling the placement device can be set up in such a way that the placement device can be moved at least by the determined correction value synchronously with the movement of the transport means and the gripper device with the changed distance. The movement control of the placement device is therefore also based on the determined correction value.

Lastly, the control device for controlling the movement of the placement device during each placement operation can be set up in such a way that the actual distance between two components placed on the first laminate layer is greater than a target length of the cut laminate component by a defined value that compensates for shrinkage of the laminate tape in the conveying direction. This allows a certain amount of shrinkage compensation to be taken into account in advance and the components to be placed at a slightly greater distance from one another after a certain minimum shrinkage has regularly occurred. With regard to the entire functionality of the control device, reference is made to the above explanations for the method.

The measuring device itself can be a camera or a fluoroscopy device or a sensor such as a profile sensor, wherein a deviation can be determined on the basis of an evaluation of one or more recorded camera or fluoroscopy images or sensor information. Furthermore, a testing device for testing the functionality of the component of the laminate component may be provided. With regard to its functionality, reference is also made to the above explanations for the method.

Furthermore, a transfer device downstream of the gripper device and receiving the laminate component from the gripper device can be provided, to which the measuring device and, optionally, the testing device are assigned. This transfer device can be a suitable transfer plate which, in accordance with an expedient development, can be pivoted and is designed for placing a laminate component on a winding tape and for delivering a laminate component to be discarded to a collecting container. It can thus be pivoted in opposite directions: in one direction for transferring a laminate component found to be good onto the winding tape, and in the other direction for discharging the laminate component to be discarded into a bad-part bin. The pivotable transfer device, which is pivoted by means of a corresponding drive motor, is of course also expediently controlled by a suitable or central control device.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
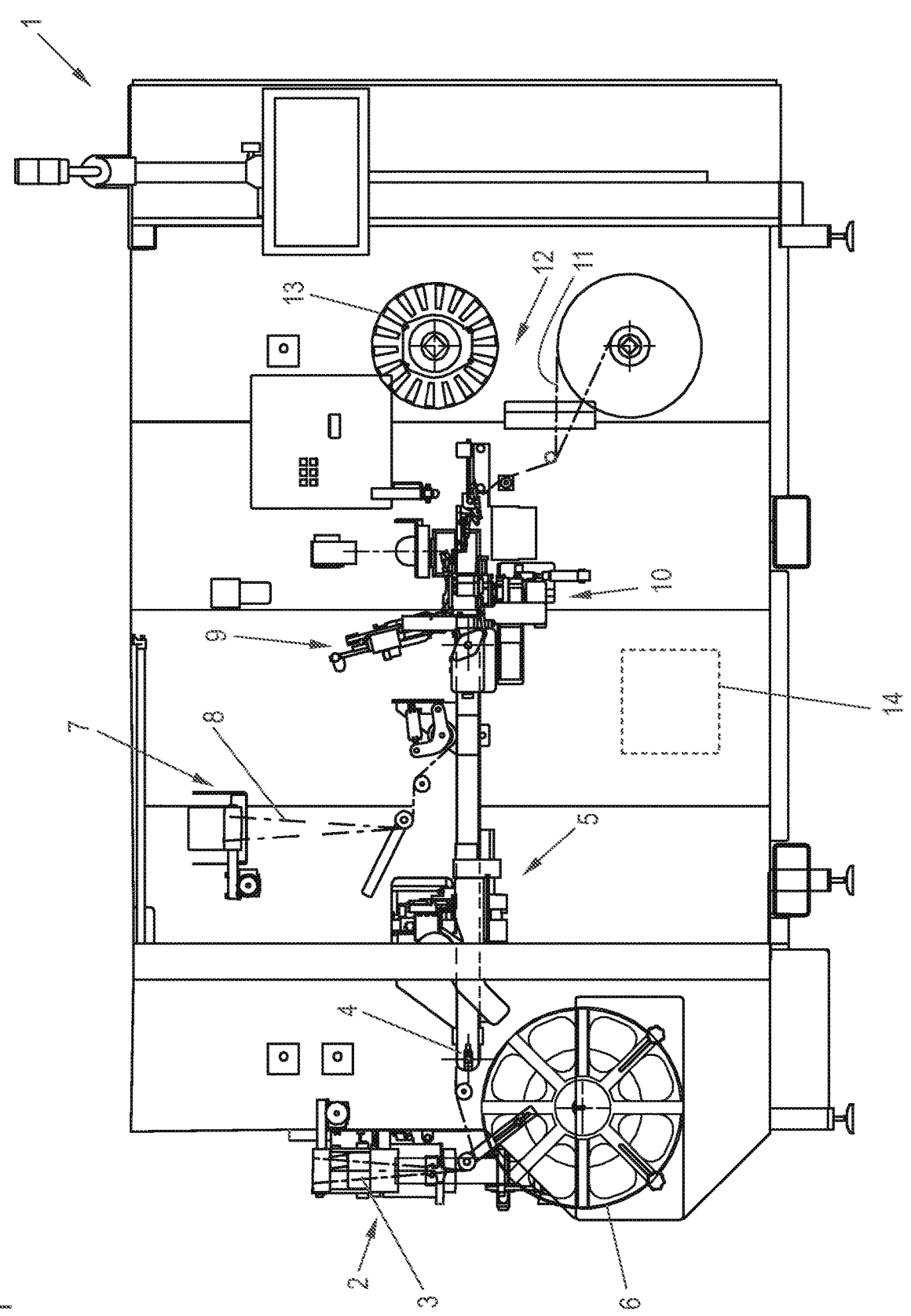
FIG. 1 shows a principle representation of a device according to the invention for carrying out the method according to the invention in a side view.

FIG. 1 shows a device 1 according to the invention for producing individual strip-like laminate components consisting of two laminate layers of an adhesive material laminated on top of each other, between which laminate layers an electronic component, in this case an RFID chip, is embedded. The device 1 comprises a first feed device 2 for feeding a lower, tape-like first laminate layer 3 as well as a transport means 4, e.g., a transport band or transport belt, onto which the lower first laminate layer 3 is placed. As FIG. 2 shows, the first feed device 2 is arranged laterally to the transport means 4, that is to say, the first laminate layer 3 is fed at an angle of 90° and then deflected and placed on the transport means 4.

Furthermore, a placement device 5 is provided for placing the individual components to be embedded on the first laminate layer 3, wherein the individual components, i.e., the RFID chips in this case, are fed from a supply roll 6 via a feed belt and are then gripped and placed in a defined manner via the placement device 5, a pick-and-place device.

Figure 2:
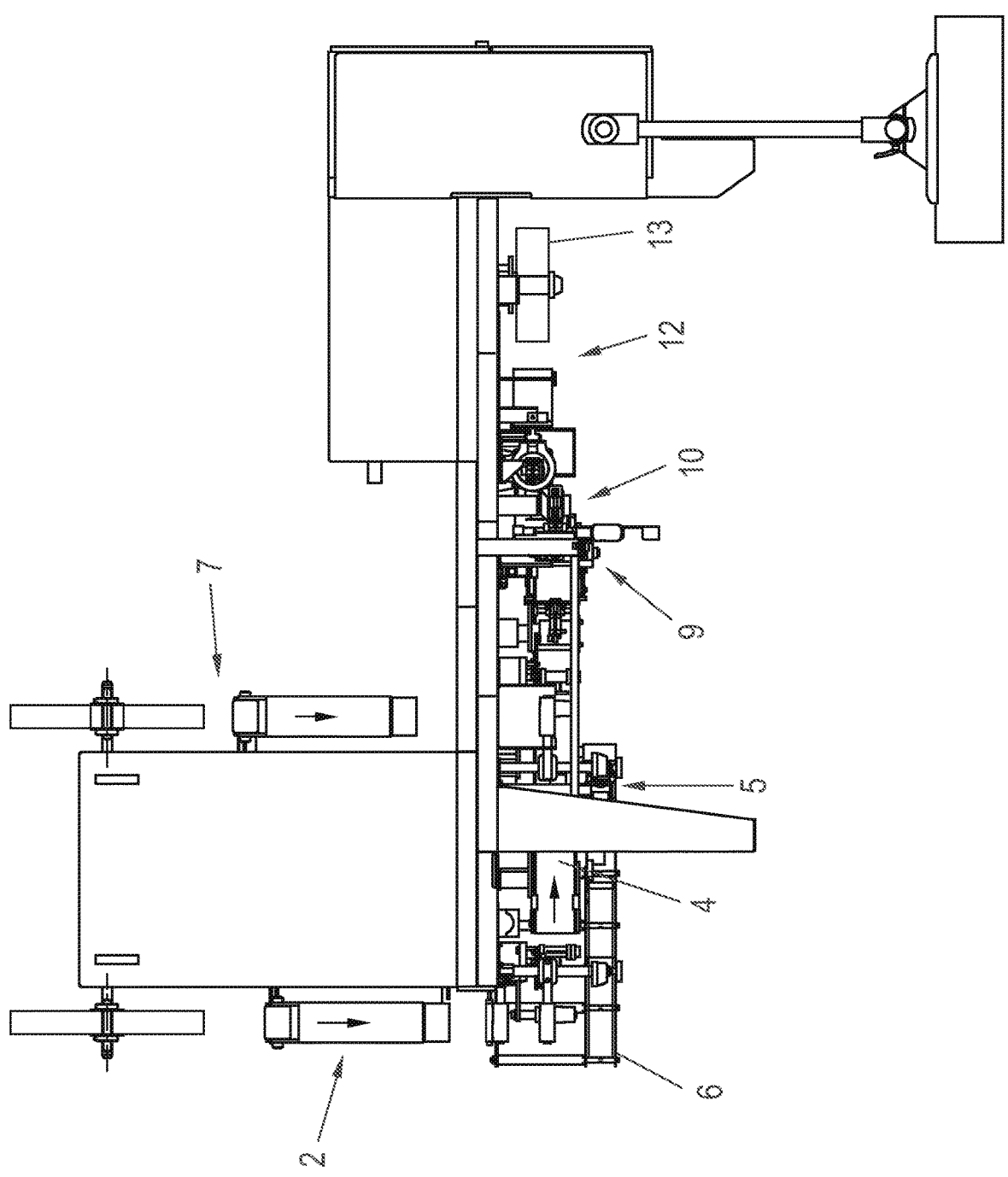
FIG. 2 shows a top view of the device from FIG. 1.

Furthermore, a second feed device 7 is provided for feeding an upper, tape-like second laminate layer 8, which, see FIG. 2, is also laterally offset from the transport means 4, so that the second laminate layer 8 is also fed at an angle of 90° and then deflected. The second laminate layer 8 is placed on the first laminate layer 3, which is already populated with the components, so that a laminate tape is formed, consisting of the firmly connected two laminate layers 3, 8 and the embedded components.

Also provided is a cutting device 9 comprising at least one movable cutting blade for cutting off individual strip-like laminate components from the laminate tape fed by the transport means 4. Downstream of the cutting device 9 is a gripper device 10 for picking up and transporting away the individual laminate components, which are finally placed on a winding tape 11 of a winding device 12, which winding tape 11 is then wound onto a roll 13.

Also shown in principle is a control device 14 for controlling the main components of the device 1, which will be discussed in greater detail below.

Figure 3:
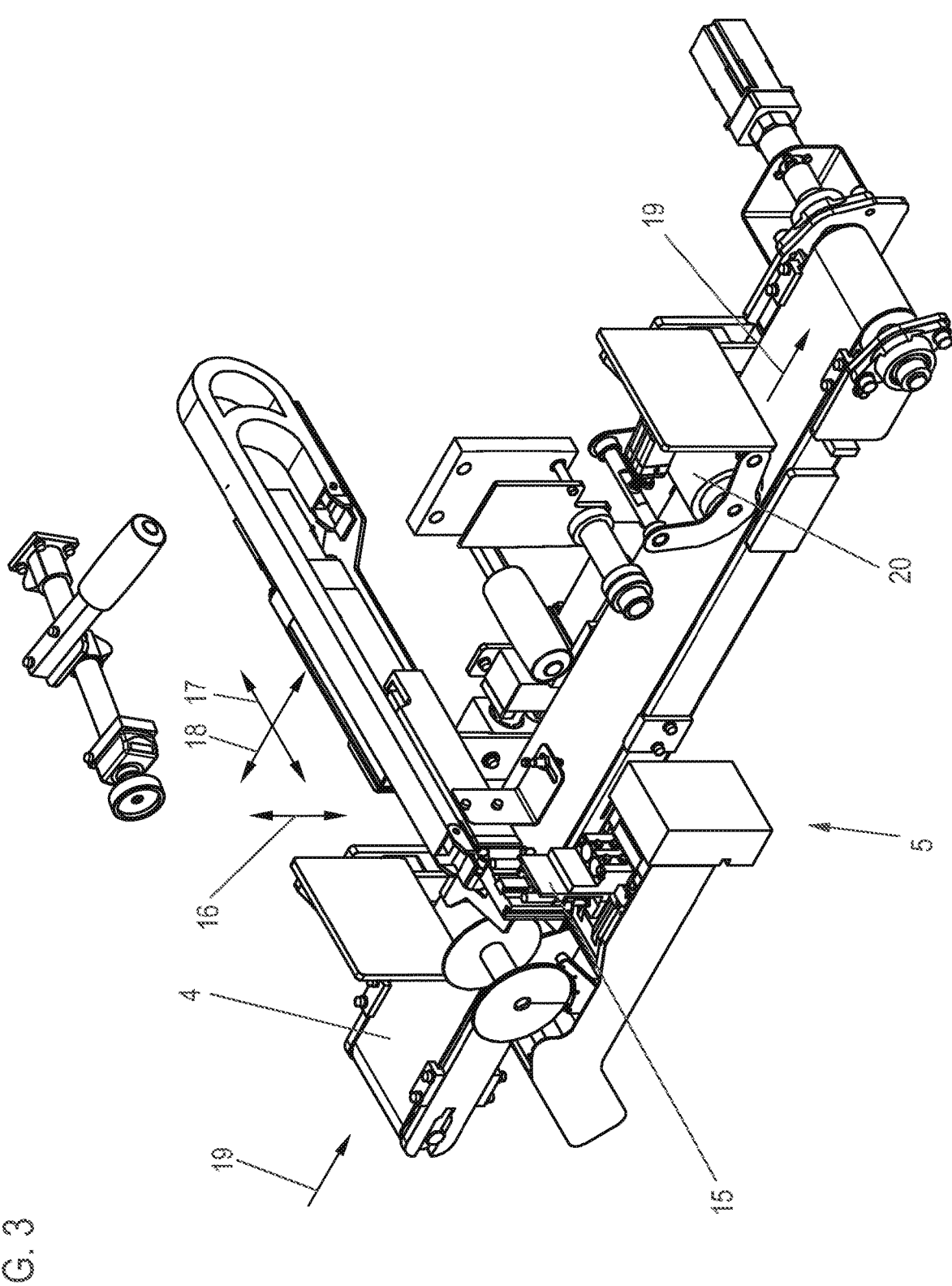
FIG. 3 shows a partial perspective view of the device showing the placement device together with the associated transport means and the second feed device.

FIG. 3 shows a perspective view of the placement and laminating area of the device 1. The transport means 4, onto which the lower first laminate layer 3 is placed, is shown. Also shown is the placement device 5, which has a suitable gripper 15 which, as shown by the arrow 16, can be moved vertically on the one hand, and can also be moved horizontally on the other hand, as shown by the arrow 17, after the component feed takes place to the side of the transport means 4 and the component has to be gripped, lifted and moved over the transport means 4 via the gripper 15 and lowered again there. Due to the movability of the placement device 5 or of the gripper 15 in the direction of the arrow 17, i.e., transversely to the transport direction, a transverse or lateral correction of the placement position of the component on the lower first laminate layer 3 is possible. As shown by the arrow 18, the gripper 15 or the placement device itself is also movable in the conveying direction of the transport means 4, which conveying direction is shown by the arrow 19, in order to be able to carry out a correction of the placement distance in the conveying direction, which will be discussed below.

Further shown is, among other things, the actual laminating roller 20, which is arranged above the transport means 4, and below which the upper second laminating layer is also fed, which is then laminated onto the lower first laminating layer 3 by means of the laminating roller 20.

Figure 4:
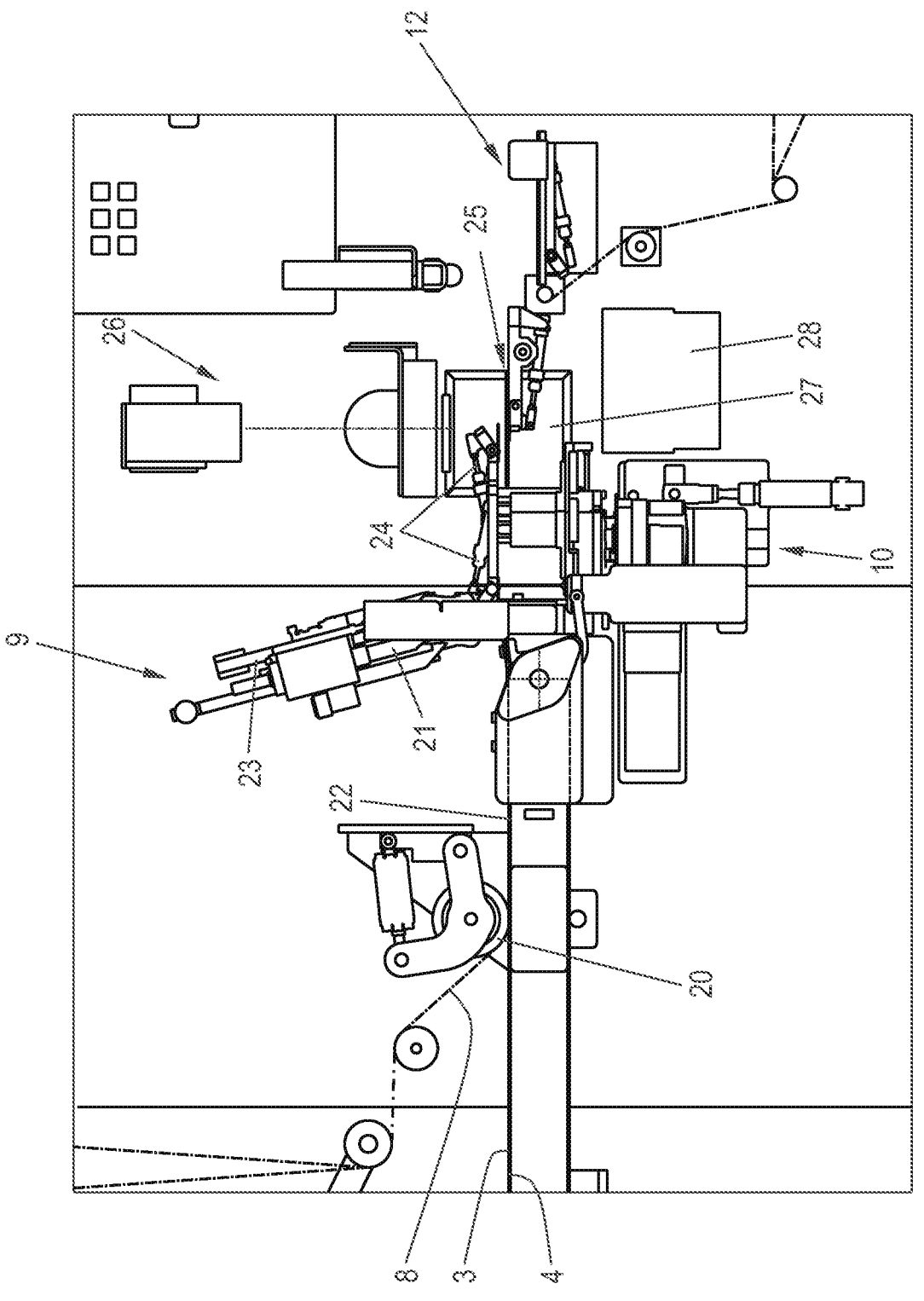
FIG. 4 shows partial view of the device from FIG. 1 showing the cutting device and the gripper device.

FIG. 4 shows a detailed view of a further area of the device 1, namely the area of the separation. The transport means 4 is again shown, as well as the first laminating layer 3 lying thereon and populated with components, which is indicated here. The second upper laminating layer 8, which is laminated on via the laminating roller 20, is also indicated.

Downstream of the transport means 4, as described, is the cutting device 9 comprising a linearly movable cutting blade 21 which runs transversely to the conveying direction 19 and cuts the laminate tape 22 to form the individual laminate components. The lifting operation of the cutting blade 21 is controlled by a suitable lifting device 23, such as a pneumatic cylinder or an electric motor, by means of which the cutting blade 21 moves down precisely at the required time in order to make the cut.

Downstream of the cutting device 9 is a gripper device 10 as described, comprising two separate grippers 24, which will be described in detail below. The two grippers 24 are arranged rotated by 180° relative to one another and they can be moved at least linearly in the horizontal; the entire unit can also be rotated by 180°, which will be discussed in greater detail below. Each gripper 24 is equipped to pick up, lift and transport away a cut laminate component and transfer it to a transfer device 25, which will also be described in detail below. From this transfer device 25, a previously measured and inspected laminate component is transferred to the winding device 12 or separated out, which will also be described later.

Associated with the area of transfer of a laminate component from a gripper 24 to the transfer device 25 is a measuring device 26, which is used to precisely measure the position of a component embedded between the two laminate layers 3, 8, in order to determine, on the basis of this measurement, whether or not any position correction is required. The aim is to ensure that the laminated component is positioned at a defined position, preferably the center of the laminate component as seen in the conveying direction. Any misalignment can be determined via the measuring device 26, with corresponding misalignment compensation then being controlled via the control device 14. For this purpose, an intervention is made in the movement mode of the gripper device 10, via which, among other things, the clocked transport of the laminate tape 22 through the cutting device 10 also takes place, just as an intervention is made in the clocked transport mode of the transport means 4, so that the transport movement of the laminate tape 22 can be influenced via this for correction purposes. The measuring device 26 is preferably a camera device, as will be discussed below.

Furthermore, a testing device 27 is shown, which is also positioned in the area of the transfer of a laminate component from a gripper 24 to the transfer device 25. This testing device can be used to check the proper functioning of the laminated component, i.e., the RFID chip, whereby such a laminate component is only transferred to the winding device 12 if the component is also functioning properly. Otherwise, the laminate component is expelled by transfer to a collecting container 28. The checking device 27 may be a corresponding reading or transmitting device which, for example, enters into contactless communication with the RFID chip in order to read out its response signals or its identification code, etc., the corresponding information being given to the control device 14 and also being stored there.

Figure 5:
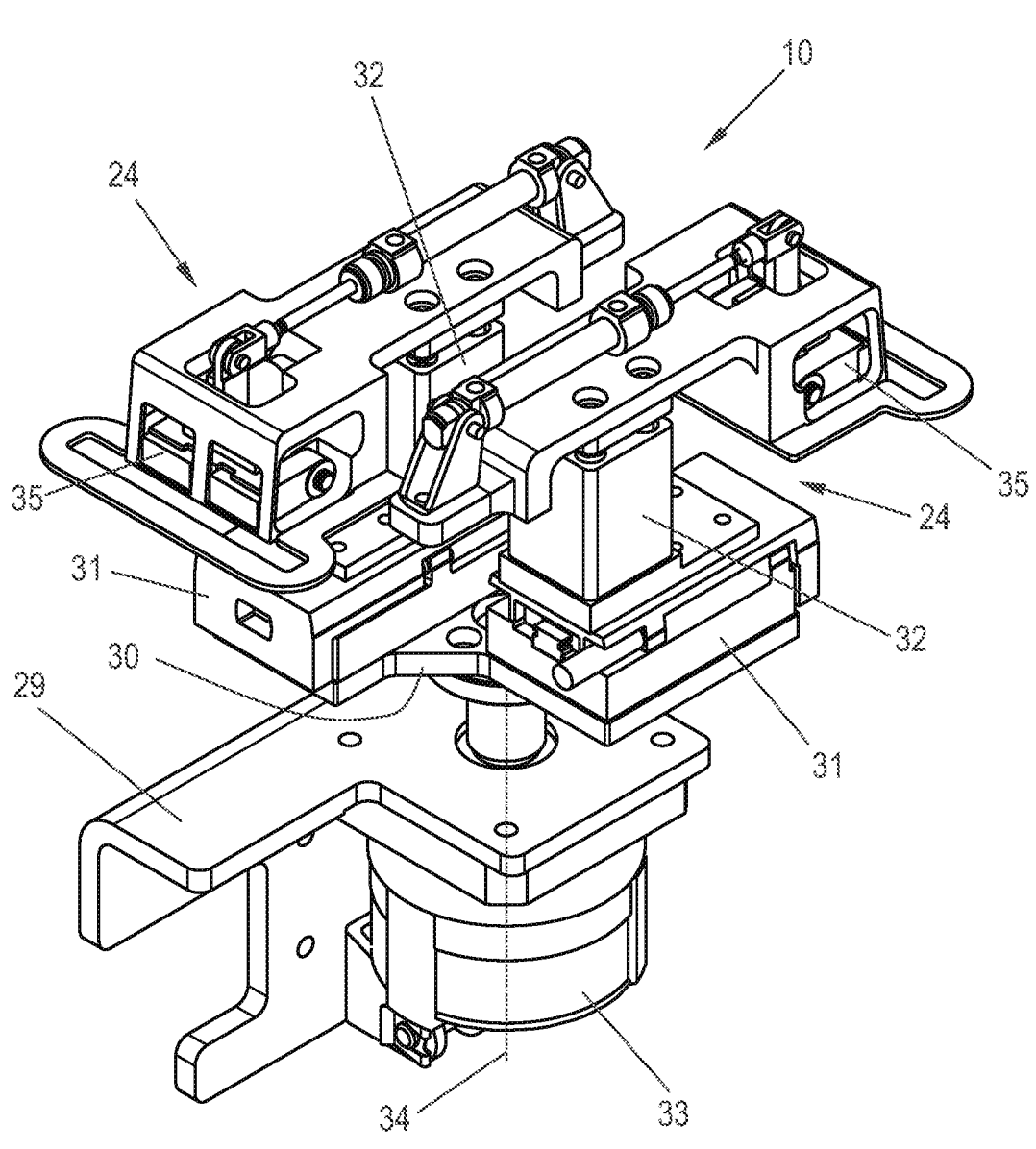
FIG. 5 shows a perspective view of the gripper device comprising two separate grippers directed in opposite directions and movable separately.

FIG. 5 shows the gripper device 10 in greater detail. As explained, it comprises two separate grippers 24, which are clearly rotated by 180° relative to one another and arranged on a common carrier 29. Two separate linear guides 31 are arranged on a platform 30, each gripper 24 being arranged on such a linear guide 31 so as to be linearly movable. This means that each gripper 24 can be moved separately linearly in the conveying direction 19 and against the conveying direction 19, for which purpose, of course, there is arranged a corresponding drive. Furthermore, each gripper 24 can also be raised and lowered vertically via a lifting cylinder 32. And lastly, the platform together with both grippers 24 can be rotated about a vertical axis of rotation 34 via a drive motor 33, so that the orientation of the two grippers 24 can be rotated by 180°. This makes it possible to position one gripper 24 in a position on the laminate tape for gripping and pulling the laminate tape 22 through the cutting device 9, while at the same time the other gripper 24 with a previously picked-up laminate component can be moved into the transfer position for transferring the laminate component to the transfer device 25.

Each gripper is provided with a suitable gripping means 35 which makes it possible, on the one hand, to grip and fix the laminate tape at the leading edge so that the laminate tape can be moved by a defined distance through the cutting device 9, i.e., under the cutting blade 31, in synchronism with the clocked feed of the transport means 4 by a linear movement of the corresponding gripper 24 along its linear guide 31. This gripper means 35 is also capable of fixing the then cut laminate component, also during the subsequent linear lifting and pivoting movement into the transfer position, where the laminate component is then deposited. An example of such a gripper device is given in DE 20 2021 101 889 U1, although the device according to the invention is not limited to the use of such a gripper device described there.

Figure 6:
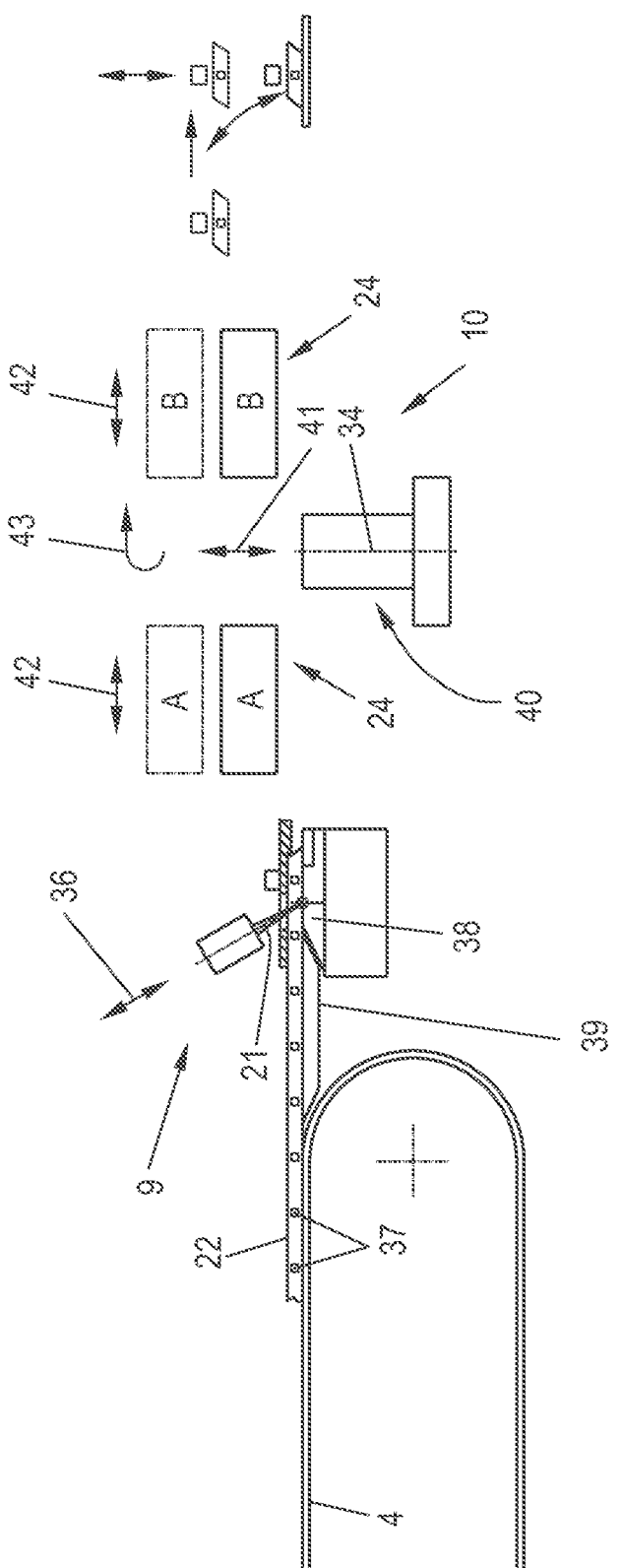
FIG. 6 shows a principle representation in a side view to explain the movements of the individual grippers.
Figure 7:
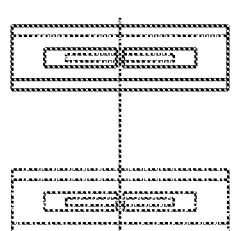
FIG. 7 shows a principle representation according to FIG. 6 in a top view.
Figure 7:
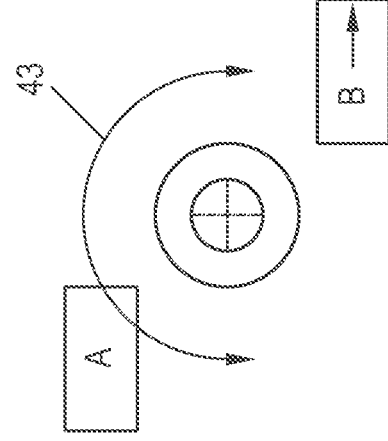
Figure 7:
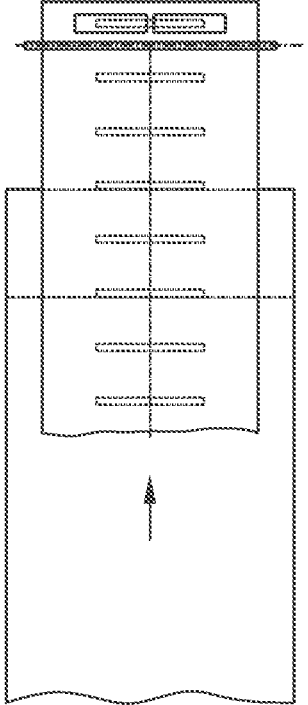

FIGS. 6 and 7 show a detail of the device 1 according to the invention in a side view and a top view, with the function of the gripper device 10 with the two grippers 5 being explained in greater detail here. The two grippers 5 are marked here with A and B to facilitate differentiation.

The cutting device 9 is shown with the cutting blade 21, which can be moved linearly as shown by the double arrow 36. Also shown is the transport means 4 with the laminate tape 22 lying thereon, on which the laminated components 37 are shown. The laminate tape 22 is pulled through and positioned under the cutting blade 21 shown here in the lowered cutting position, after which the cutting blade 21 moves off and runs against a blade table 38 on which the laminate tape 22 lies, and where the cut is made. The small distance between the end of the transport means 4 and the knife table 38 is bridged by a transfer table 39, on which the laminate tape 22 lies.

Shown, as described, are the two grippers A and B, which are connected via a movement device 40, only stylized here, which permits the corresponding linear adjustments, stroke adjustments and rotational adjustments as described with respect to FIG. 5, so that the grippers A, B can be moved in the degrees of freedom described above. They are each separately vertically raisable, as shown by arrow 41, they are each separately linearly movable, as shown by arrows 42, and they can be rotated together about the vertical axis 34, as shown by arrows 43. This makes it possible to exchange the positions of the gripper devices A, B.

The function of this gripper device 10 is as follows:

With the cutting blade 21 raised, it is assumed that the gripper A is moved into a position in which it can grip the leading edge of the laminate tape, i.e., it is ultimately positioned with its gripping means 35 above this edge area. For gripping, it is brought into corresponding contact with the laminate tape 22. The transport means 4 and the gripper A are then operated synchronously. The transport means 4 conveys by a defined distance in conveying direction 19, at the same time the gripper A lifts the leading edge of the laminate tape 22 slightly and also moves linearly in conveying direction 19 also by the defined distance until the final cutting position is reached, where the transport means 4 stops, as does the gripper A, which then deposits the laminate tape 22 on the knife table 28.

Parallel to this, there is also a corresponding movement of gripper B, which was previously in the position of gripper A and picked up a laminate component there. It is now in the transfer position and is now able to transfer the laminate component to the transfer device 25.

After the cut has been made via the cutting blade 21, when this has been raised again, the gripper A lifts the separate laminate component now located on the gripping means 35, and, if necessary, it moves again a short distance in the conveying direction. At the same time, the gripper B transfers the laminate component to the transfer device 25. Now, a rotation of the entire gripper device about the vertical axis 34 takes place, so that the occupied gripper A is rotated into the transfer area, while the empty gripper B is rotated into the area of the cutting device 9. The process described above now starts again from the beginning, i.e., for the next cut the gripper B is brought into the gripping area for receiving the leading edge of the laminate tape 22, which is then gripped and pulled through the cutting device 9, synchronously clocked together with the transport means with the gripper B by the corresponding linear movement. At the same time, the gripper A is also brought into the corresponding transfer position. After the cut has been made, the cut laminate strip is lifted again by the gripper B, while at the same time the gripper A has delivered its laminate strip to the transfer device 25.

Figure 8:
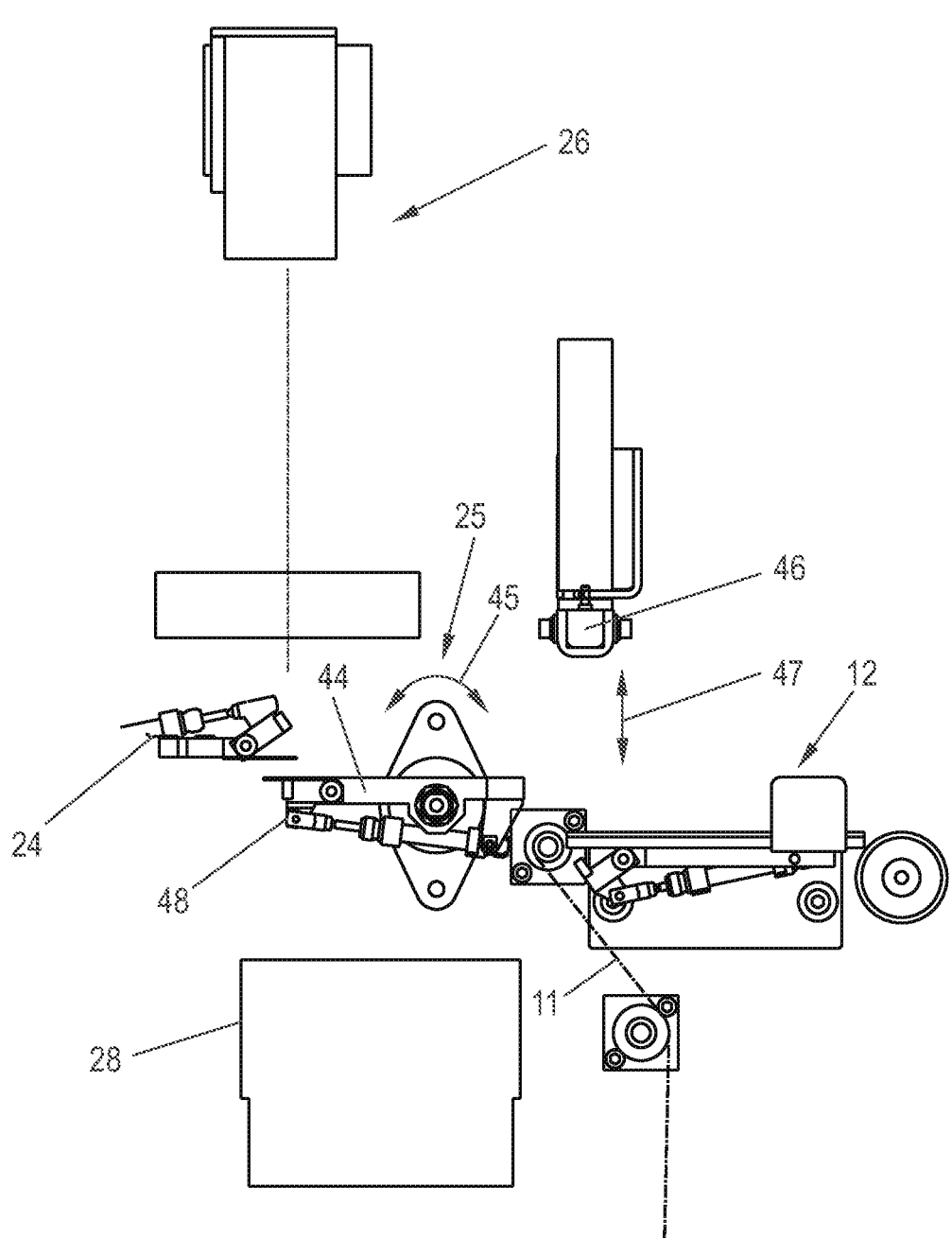
FIG. 8 shows a partial view of the device from FIG. 1 showing the transfer device together with the associated measuring device in the form of a camera device and downstream winding tape or collection container.

FIG. 8 shows a principle representation of the transfer area with the associated measuring device. A detail of a gripper 24 is shown, which is approximately in the transfer position to the transfer device 25. The transfer device 25 comprises a transfer plate 44 onto which the gripper 24 deposits the laminate component. After depositing, the gripper 24 moves back again a short distance to allow the laminate component to be measured by the measuring device 26. If this measurement, which is described in greater detail below, shows that the laminated component is correctly positioned in the laminate strip or within the tolerances, no correction is required; if a correction is indeed required, however, the corresponding correction is made, which is described below. At the same time, the corresponding functional test of the component is also carried out via the testing device 27, which is not shown in greater detail here, as described.

If the function test is positive and the measurement also shows that the component is correctly positioned, the transfer plate 24 pivots to the right, as shown by the double arrow 45, and places the laminate component on the winding tape 11 of the winding device 12. Via a presser 46, which can be moved vertically up and down as shown by the arrow 47, after the transfer plate 44 has pivoted back again, the placed laminate component is pressed slightly against the winding tape 11, where the laminate component, since it consists of a tacky material, adheres slightly. The winding tape 11 is then wound up into a roll.

If the function test, and if necessary also the measurement, shows that either the component is not functioning correctly or that the component is outside the position tolerance, the transfer plate 44 pivots to the left, i.e., tilts downwards, so that the laminate component found not to be in order is discharged into the collection container 28.

For fixing the laminate component to the transfer plate 44, a fixing device may be provided, for example in the form of an adjustable magnet 48, which may be adjusted between a holding position, in which the laminate component is magnetically fixed to the embedded component via a magnetic coupling of the magnet 48, and a release position, which permits delivery either to the winding tape 11 or to the collection container 28. Like all movements of the movable components, this movement is controlled by the control device 14.

Figure 9:
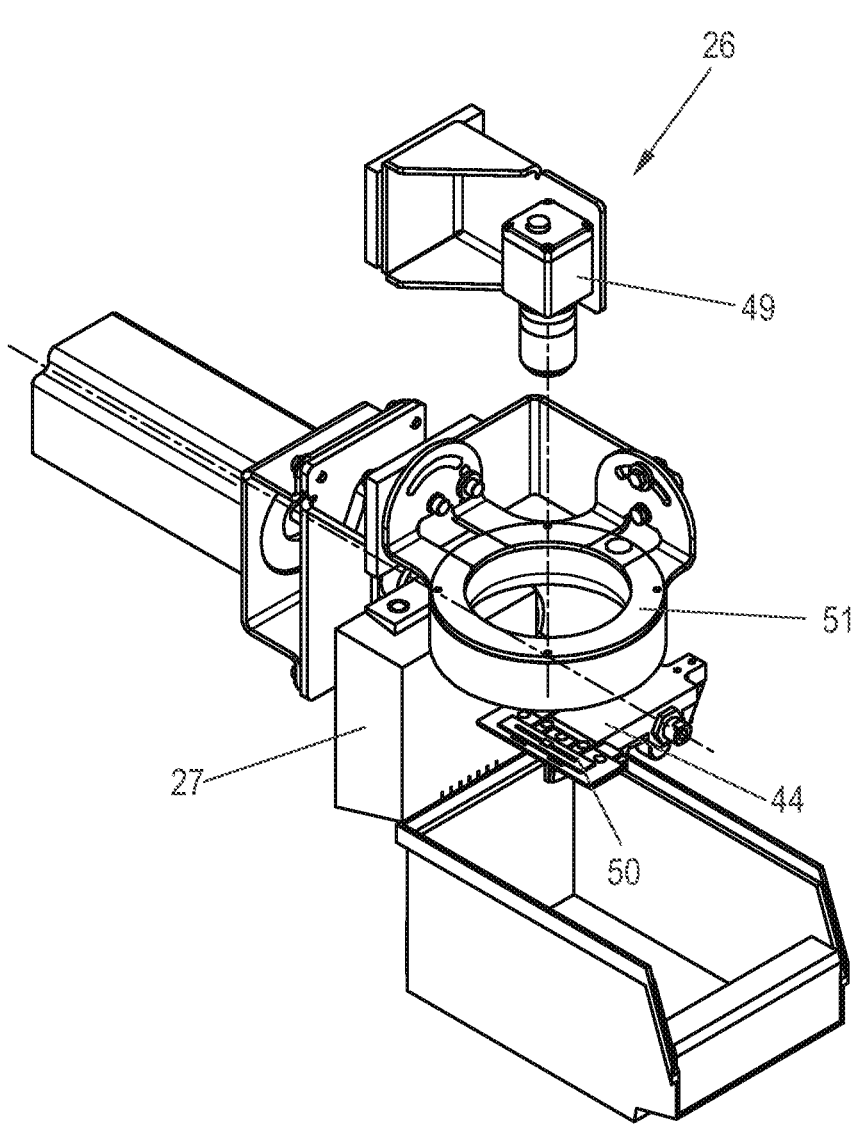
FIG. 9 shows a perspective view of the measuring device with transfer device and collection container.

FIG. 9 shows a more detailed view of the measuring device 26, which comprises a camera 49 positioned above the transfer plate 44, on which a laminate component 50 is positioned in the example shown. Associated with the camera 49 is an illumination device 51, for example a circumferential ring light, which illuminates the laminate component 50 during the camera exposure so that corresponding edges or contours become visible within the camera images, on the basis of which the position can be determined.

Also shown is the testing device 27, which is clearly also immediately adjacent to the laminate component 50 and can thus perform the functional test.

Figure 10:
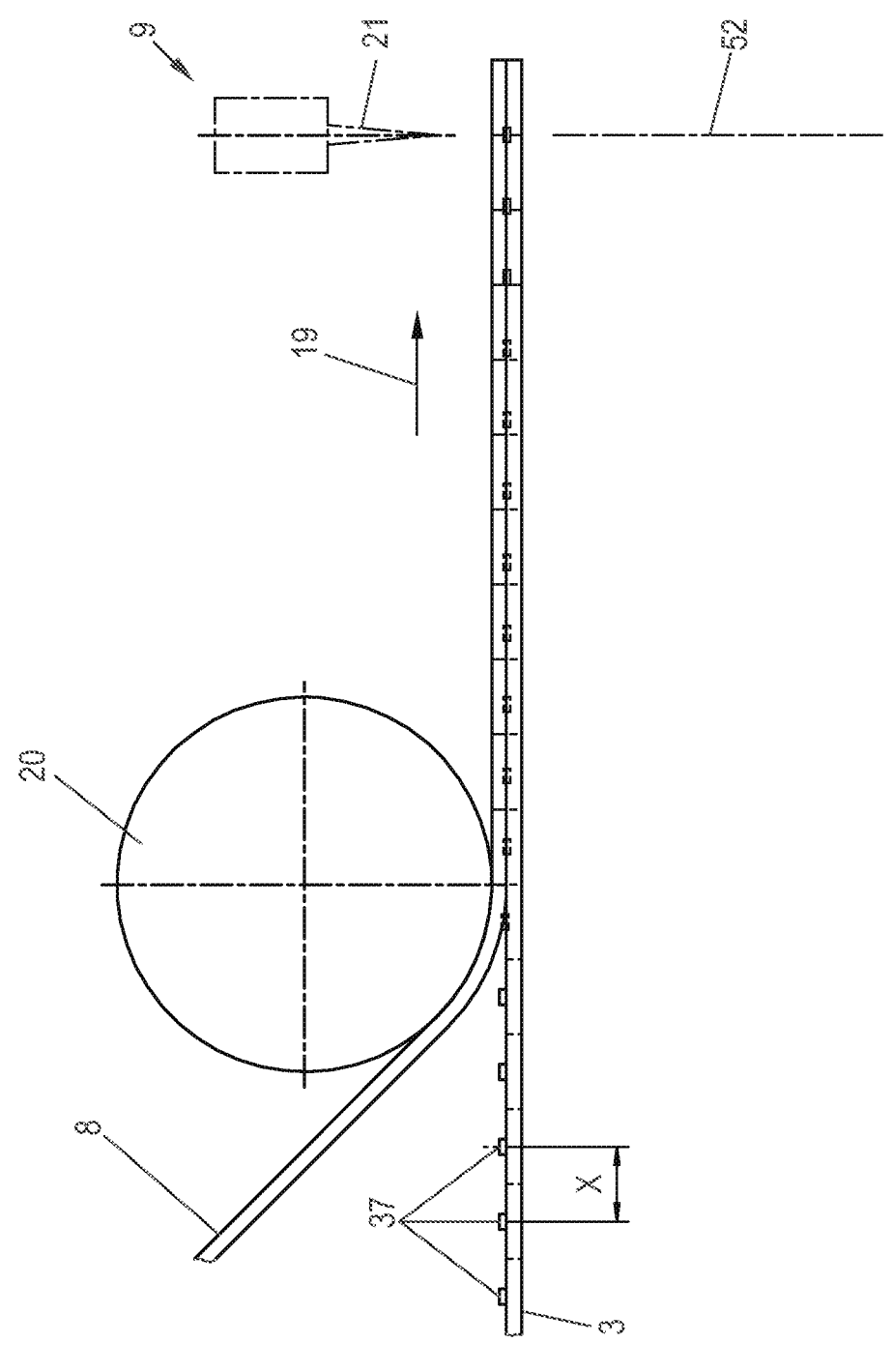
FIG. 10 shows a principle representation explaining the lamination process.

FIG. 10 shows the lamination process in the form of a principle representation. The lower first laminate strip 3 is shown, on which the components 37, i.e., the RFID chips, placed at defined distances X via the placement device 5 are already arranged. From above, the upper second tape-like laminate layer 8 is fed, which is pressed onto the lower laminate layer 3 via the laminate roller 20, so that the components 39 are laminated in between in a sandwich-like manner. Also shown by way of example is the cutting device 9 with the cutting blade 21, which makes the cut along a cutting line 52.

Figure 11:
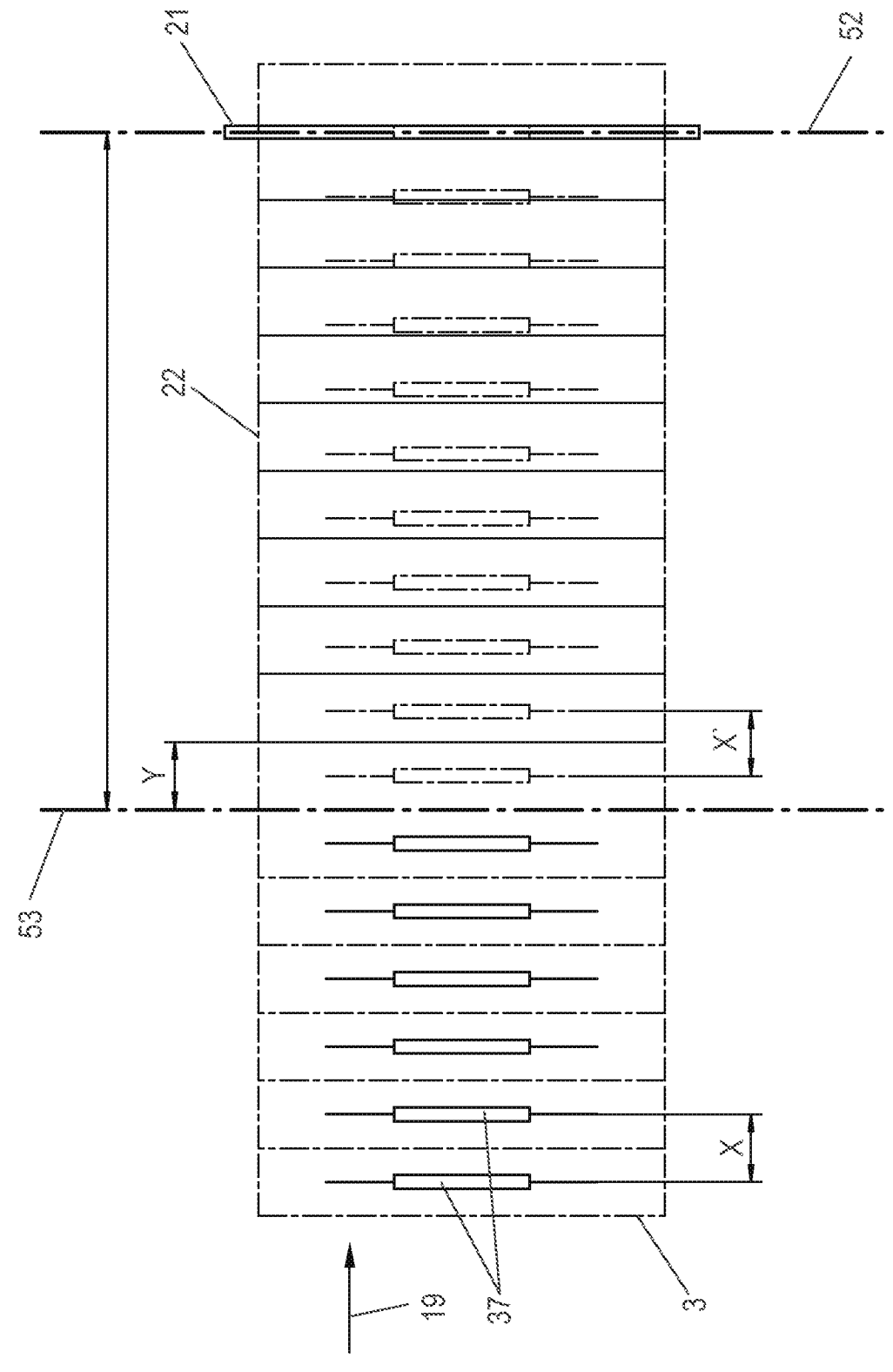
FIG. 11 shows a top view of the laminate tape showing the embedded components.

The principle illustration according to FIG. 11 shows that, after lamination, there may be a slight shrinkage of the material, in particular in the conveying direction 19, which results in the original placement distance X, which the individual components 37 have from one another, successively decreasing somewhat, so that there is a corresponding positional offset of the component 37 at the actual cutting line 52.

On the left in FIG. 11, only the lower laminate layer 3 is shown, onto which the components 37 are applied via the placement device 5 at exactly the defined distance X, for example 10 mm. This position is maintained up to the actual laminating point 53, where the upper laminate layer 8 is laminated on via the laminating or pressure roller 20. However, since both the lower and upper laminate layers 3, 8 have some degree of inherent tension due to the winding and unwinding process into and from the rolls to which they were originally wound, and since further tension may be applied to the laminate tape 22 via the laminating roll 20, a small amount of shrinkage occurs in the conveying direction 19, as evidenced by a slight change in the distance of the components 37 from the lamination point 53 to the cut line 52. The changing distance is shown as X' in FIG. 11 and is also shown pictorially, albeit exaggerated. While immediately behind the laminating point 53, the laminate component 37 shown there is still in the center of the imaginary laminate component, which has a cutting width and thus length in the transport direction 19 of Y, and it moves toward the edge of the imaginary laminate component with increasing movement in the direction of the cutting line 52, as FIG. 11 shows abundantly clearly and graphically. In other words, there may be a slight offset over the relatively short conveying distance between the laminating point 53 and the cutting line 52.

Figure 12:
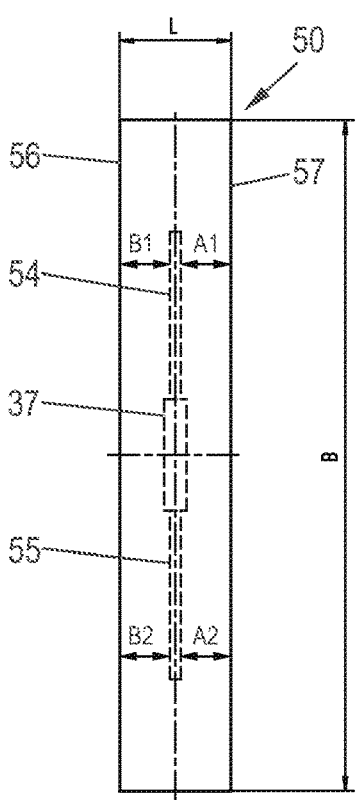
FIG. 12 shows a principle representation of an ideal strip-like component with centrally arranged component.

This offset is illustrated again with reference to FIGS. 12 and 13. Shown in FIG. 12 is a laminate component 50 that has an ideal shape. The component 37, i.e., the RFID chip, is located exactly centrally within the laminate component 50, which has a width B and a length L, respectively of the two laminate layers 3, 8. This is detected by means of the measuring device 26, which, as described in the example shown, supplies camera images within which contours of the component 37 are visible, which can be evaluated. These contours show, for example, the corresponding antennas 54 of the RFID chip, which run in the direction of the width B of the laminate component. The control device 14 or an image processing device is now able to detect the distance of the two antennas 54, 55 to the respective edges 56, 57 of the laminate component. For each antenna 54, 55, a distance to the edge 56 and to the edge 57 is detected respectively. In the case of the antenna 54, these are the distances A1 to the edge 57 and B1 to the edge 56, and, in the case of the antenna 55, these are the distances A2 to the edge 57 and B2 to the edge 56. On the basis of these measured values, the position of the component 37 in the laminate component 50 can now be detected exactly, and on the basis of these distances, a corresponding center offset can also be determined if the positioning is inaccurate, this center offset then also directly indicating a corresponding correction value for the section width, where therefore cutting is then to be carried out. The calculation results as follows:

$$K=[(A1+A2)/2-(B1+B2)/2]/2$$

Figure 13:
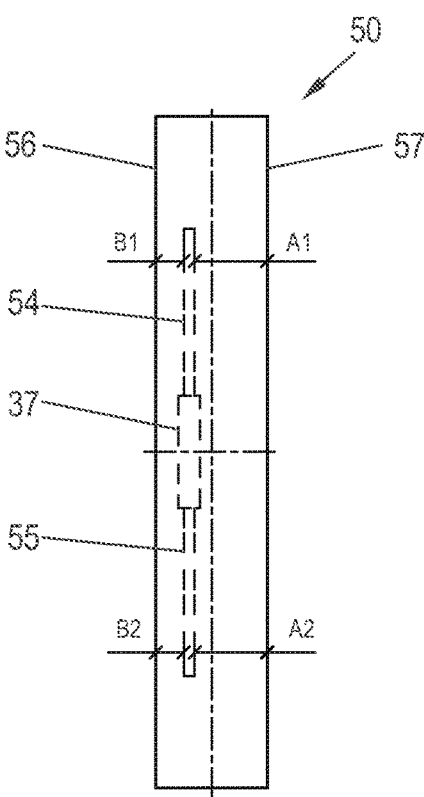
FIG. 13 shows a principle representation of a strip-like laminate component with eccentrically arranged component to explain the correction process.

FIG. 13 shows a laminate component 50 in which a certain amount of shrinkage has occurred. It is evident that the component 37 is not positioned centrally, as seen in the longitudinal direction, but is slightly offset from the edge 56. Again, by means of the measuring device 26 and evaluation of the corresponding camera images, the corresponding set of distance values A1, A2, B1 and B2 is determined. Using the formula given above, a corresponding center offset or correction value K is then obtained, which indicates exactly this offset. The actual correction is then made by this correction value K via the control device 14, which controls the conveying cycle accordingly. The control device 14 is now able to control both the transport means 4 and the movement of the corresponding gripper 24 or A, B, which grips the leading edge of the laminate tape 22, in such a way that a predetermined distance by which the transport means and the gripper have been moved synchronously in the conveying direction and consequently also the laminate tape 22 has been moved is increased or decreased depending on the correction value. That is to say, both the transport means 4 and the gripper 24, A, B are controlled to move the laminate tape 22 by a changed distance. The determined correction value thus indicates the specific deviation of the distinguished component position in or against the conveying direction 19, in the example shown against the conveying direction 19. The value of the distance by which the laminate tape 22 is originally transported in a clocked manner is now changed by this correction value. In the example shown, the distance would be increased by the correction value K, i.e., instead of a previously controlled distance of 10 mm and a correction value K of 0.2 mm, for example, a distance of 10.2 mm is controlled in the immediately following transport step, i.e., the transport means 4 and the gripper 24 now synchronously and jointly move the laminate tape through the cutting device 9 by 10.2 mm. This leads to the fact that, in the immediately following cut, ideally, the previously detected offset is compensated and the subsequently cut laminate component is again close to the ideal state shown in FIG. 12, i.e., the component 37 is located in the longitudinal center.

Here, any offset can not only be given against the conveying direction, as indicated in the example, it can also be given in the conveying direction. This means that the actual correction value can be either positive or negative. Primarily, however, it can be assumed that, after shrinkage resulting from the reduction of inherent tensions sets in, a positive correction value, i.e., an increase in the linear dimension, will be given.

As described, the correction value K is preferably determined by the control device 14, which controls the corresponding conveying cycle operation. The control device 14 can be set up here so that a correction is not carried out for every infinitesimally small deviation, i.e., for every correction value K, no matter how small. It is conceivable that a kind of tolerance interval is set around the actual center position, and a correction is omitted if the determined correction value K lies within this tolerance range. If, for example, a target width of the laminate component, i.e., the length L according to FIG. 12, of 10 mm is defined, a correction window of +/−0.2 mm, for example, can be set. Thus, if a determined correction value is within this window of +/−0.2 mm around the center, no correction is made. If a correction value of, for example, 0.3 mm results, the correction would be made by 0.3 mm.

At the same time, an upper limit can also be set with regard to a maximum permissible correction. For a cutting width of 10 mm, for example, this upper limit can be set to +/−0.35 mm. If a correction value of, for example, 0.4 mm is now obtained, only a correction of a maximum of 0.35 mm is carried out, in spite of everything. This serves to avoid any overshoots or overcorrections. In fact, the ideal situation can ultimately be approached again iteratively, since a corresponding check is carried out for each cut, so that the success of a correction made can be checked immediately.

As already described above, the placement device 5 or the gripper arrangement 15 can also be moved in the conveying direction 19, as shown by the arrow 18. This means that the placement position can be varied by this. In this way, it is possible to counteract any known change in position of the component positions within the laminate tape 22 to a certain extent or to compensate for such a change in advance. If, for example, it is known that shrinkage always occurs in the material to be processed, and that this shrinkage is at least 0.15 mm in the region between the lamination point 53 and the interface 52, this known shrinkage offset can be compensated for to some extent inherently by changing the placement position. For example, with a cut length, i.e., a length L of the laminate component of 10 mm, a placement distance of 10.15 mm can be controlled instead of the placement distance of 10 mm given without shrinkage. Although the transport means 4 and the gripper device 10 transport the laminate tape by (ideally, because uncorrected) 10 mm, the placement device 5 nevertheless performs the placement with 10.15 mm. This is because the correcting 0.15 mm shrink during the shrinkage between the laminating point 53 and the cut line 52, although the shrinkage may also be somewhat greater, so that at least partial compensation takes place.

In order to be able to make a placement on the material by the transport means 4 and the gripper device 10 with a slightly larger distance, with a given feed of 10 mm, it is necessary for the placement device 5 or the gripper arrangement 15 to also move in a clocked manner for each placement operation by the correction dimension, in the example described 0.15 mm, more specifically, if placement is to be performed with a total of 10.15 mm, against the conveying direction 19.

In the event that a correction value K has been determined and an intervention is made in the clocked placement operation of the transport means 4 and the gripper device 10 via the control device 14, the correction value must be taken into account in the movement of the placement device 5, i.e., the basic shrinkage compensation. If, for example, a correction value of 0.3 mm results by which the clocked feed increases the distance, this increase of 0.3 mm is to be taken into account in the movement of the placement device 5. In this case, the placement device would be moved by 0.15 mm in the conveying direction as part of the immediately following placement operation carried out synchronously with the change in the distance, in order, on the one hand, to take into account the distance correction of the clocked feed, but, on the other hand, to in turn carry out the basic shrinkage compensation. This means that both a basic correction and a determined actual correction are ultimately taken into account cumulatively.

As already described, a transverse correction of the placement position via the placement device 5 or the gripper 15 in the direction of the arrow 17 in FIG. 3 is also possible in principle, i.e., the position of the component relative to the two side edges of the first laminate layer 3 can be precisely adjusted. Any incorrect positioning can be determined by evaluating the camera images, whereupon a corresponding position correction transverse to the transport direction is possible.

An RFID chip was described above as an example of a component 37. Of course, it is also conceivable to laminate in other types of electronic components, although in these cases, too, there are corresponding requirements for the positioning accuracy of the components within the laminate component.

While specific embodiments of the invention have been shown and described in detail to illustrate the inventive principles, it will be understood that the invention may be embodied otherwise without departing from such principles.

We claim:

1. A method for producing separated strip-shaped laminate components comprising an electronic component embedded between two laminate layers of a ribbon-shaped material, in which method individual components are placed at defined intervals by means of a placement device onto a ribbon-shaped, lower first laminate layer moved in a conveying direction by means of a transport means, after which a ribbon-shaped, upper second laminate layer moved in the conveying direction is applied to the first laminate layer with embedding of the components so as to form a laminate tape, the individual strip-shaped laminate components being cut from the laminate tape, which is conveyed by means of the conveying means, by a cutting device comprising at least one movable cutting blade, which laminate components are picked up by means of a gripper device and transported away, the front end of the laminate tape being gripped by means of the gripper device in the region of a component and moved synchronously with the clocked movement of the transport means by a predetermined distance through the cutting device and positioned relative to the cutting blade, wherein the actual position of the component in the laminate component in relation to the conveying direction is detected by means of a measuring device connected downstream of the cutting device, and, when a deviation of the actual position from a defined target position is detected, the synchronous movement of the transport means and the gripper device is controlled in dependence on the detected deviation.

2. The method according to claim 1, wherein, in order to detect the actual position, at least one distance value of a component position assigned to the component relative to at least one edge of the laminate component running transversely to the conveying direction is determined by means of the measuring device, with any deviation being determined on the basis of the distance value.

3. The method according to claim 2, wherein a first distance value between a first component position and a first edge lying in the conveying direction as well as a second distance value between a second component position and a second edge lying against the conveying direction are determined, with any deviation being determined on the basis of both distance values.

4. The method according to claim 3, wherein two first distance values to separate first component positions offset transversely to the conveying direction and two second distance values to separate second component positions offset transversely to the conveying direction are determined and any deviation is determined on the basis of all four distance values.

5. The method according to claim 1, wherein an offset value describing the deviation is determined on the basis of the distance value or values and describes any offset of a distinguished component position, from a target position, the transport means and the gripper device being controlled in dependence on the offset value.

6. The method according to claim 5, wherein the offset value is used as correction value by which the distance is increased or decreased, the transport means and the gripper device being controlled to move the laminate tape by the changed distance.

7. The method according to claim 1, wherein the synchronous movement of the transport means and the gripper device is controlled in dependence on a detected deviation only if the detected deviation or a determined offset or correction value is greater than a defined threshold value.

8. The method according to claim 1, wherein a control of the synchronous movement of the transport means and the gripper device is limited to a defined limit value in dependence on a detected deviation if the detected deviation or a determined offset or correction value is greater than the defined limit value.

9. The method according to claim 1, wherein, together with the transport means and the gripper device, the placement device, which can be moved in and against the conveying direction, is also controlled in dependence on the deviation determined.

10. The method according to claim 9, wherein the placement device is moved at least by the determined offset or correction value synchronously with the movement of the transport means and the gripper device with the changed distance.

11. The method according to claim 1, wherein the placement device is moved during each placement operation in such a way that the actual distance between two components placed on the first laminate layer is greater than a target length of the cut laminate component by a defined value compensating for a shrinkage of the laminate tape in the conveying direction.

12. The method according to claim 10, wherein the movement of the placement device results from the defined length dimension and the correction value.

13. The method according to claim 1, wherein the measuring device is a camera or a fluoroscopy device or a profile sensor, a deviation being determined on the basis of an evaluation of one or more recorded camera or fluoroscopy images or on the basis of sensor information supplied by the profile sensor.

14. The method according to claim 1, wherein, by means of a testing device, the functionality of the component of the laminate component is tested.

15. The method according to claim 1, wherein the gripper device transports the laminate component to a transfer device to which the measuring device and, optionally, the testing device are assigned.

16. The method according to claim 1, wherein a laminate component which has a deviation not exceeding a reject limit value and which, if detected, fulfills a requirement set for its functionality is deposited on a winding tape.

17. The method according to claim 1, wherein a laminate component having a deviation exceeding a reject limit value or not meeting a requirement set for its functionality is discarded.

18. The method according to claim 15, wherein the laminate component to be deposited on the winding tape is deposited on the winding tape by means of the transfer device, and in that the laminate component to be discarded is discarded directly by the transfer device.

19. The method according to claim 1, wherein the placement position of a component transverse to the conveying direction can be varied via the placement device.

20. A device for producing separated strip-shaped laminate components comprising an electronic component embedded between two laminate layers of a ribbon-shaped, adhesive material, comprising a first feed device for feeding a lower, ribbon-shaped first laminate layer and a transport means receiving the first laminate layer, a placement device for placing individual components at defined intervals on the first laminate layer, which is moved in a conveying direction by the transport means, a second feed device for feeding an upper, ribbon-shaped second laminate layer and placing the second laminate layer on the first laminate layer while embedding the components so as to form a laminate tape, a cutting device comprising at least one movable cutting blade for cutting off individual strip-shaped laminate components from the laminate tape conveyed by the transport means, a gripper device for picking up and transporting away the individual laminate components, the gripper device being designed for gripping the front end of the laminate tape in the region of a component and being movable synchronously with the transport means movable in clocked fashion by a predetermined distance for moving the laminate tape through the cutting device and positioning the laminate tape relative to the cutting blade, wherein a measuring device is provided downstream of the cutting device and is designed to detect the actual position of the component in the laminate component in relation to the conveying direction, it being possible, when a deviation of the actual position from a defined target position is detected, to control the synchronous movement of the transport means and of the gripper device via a control device in dependence on the detected deviation.

21. The device according to claim 20, wherein the measuring device is set up to determine one or more distance values of one or more component positions assigned to the component from at least one edge of the laminate component running transversely with respect to the conveying direction, and to determine an offset value describing the deviation on the basis of the distance value, the offset value describing any offset of a distinguished component position, from a target position, in the transport means and the gripper device being controllable via the control device in dependence on the offset value.

22. The device according to claim 21, wherein the offset value is used as a correction value by which the specified distance is increased or decreased, the transport means and the gripper device being controllable via the control device in such a way that the laminate tape can be moved by the changed distance.

23. The device according to claim 20, wherein the control device is set up in such a way that the synchronous movement of the transport means and the gripper device is controlled in dependence on a detected deviation only if the detected deviation or a determined offset or correction value is greater than a defined threshold value.

24. The device according to claim 20, wherein the control device is set up in such a way that control of the synchronous movement of the transport means and the gripper device is limited to a defined limit value in dependence on a detected deviation if the detected deviation or a determined offset or correction value is greater than the defined limit value.

25. The device according to claim 20, wherein, together with the transport means and the gripper device, the placement device, which can be moved in and against the conveying direction, can also be controlled via the control device in dependence on the deviation determined.

26. The device according to claim 20, wherein the control device for controlling the placement device is set up in such a way that the placement device can be moved at least by the determined correction value synchronously with the movement of the transport means and the gripper device with the changed distance.

27. The device according to claim 20, wherein the control device for controlling the movement of the placement device during each placement operation is set up in such a way that the actual distance between two components placed on the first laminate layer is greater than a target length of the cut laminate component by a defined value that compensates for shrinkage of the laminate tape in the conveying direction.

28. The device according to claim 20, wherein the measuring device is a camera or a fluoroscopy device or a profile sensor, wherein a deviation can be determined on the basis of an evaluation of one or more recorded camera or fluoroscopy images or sensor information.

29. The device according to claim 20, wherein a testing device is provided for testing the functionality of the component of the laminate component.

30. The device according to claim 20, wherein a transfer device is provided, which is connected downstream of the gripper device and receives the laminate component from the gripper device and to which the measuring device and, optionally, the testing device are assigned.

31. The device according to claim 30, wherein the pivotably designed transfer device is designed for placing a laminate component on a winding tape and for delivering a laminate component to be discarded to a collecting container.

32. The device according to claim 20, wherein the placement position of a component transverse to the conveying direction can be varied via the placement device.

33. The method according to claim 1, wherein the ribbon-shaped material is a rubberized material.

34. The method according to claim 5, wherein the distinguished component position is the center of the component as seen in the conveying direction, and the target position is the center of the laminate component as seen in the conveying direction.

35. The device according to claim 20, wherein the ribbon-shaped adhesive material is a rubberized material.

36. The device according to claim 21, wherein the distinguished component position is the center of the component as seen in the conveying direction, and the target position is the center of the laminate component as seen in the conveying direction.

\* \* \* \* \*